(12) United States Patent
Li et al.

(10) Patent No.: US 10,156,629 B2
(45) Date of Patent: Dec. 18, 2018

(54) DEVICE POSITIONING

(71) Applicant: International Business Machines Corporation, Armonk, NY (US)

(72) Inventors: Yu Bo Li, Beijing (CN); Yong Hua Lin, Beijing (CN); Qing Wang, Beijing (CN); Chao Xue, Beijing (CN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 378 days.

(21) Appl. No.: 14/919,776

(22) Filed: Oct. 22, 2015

(65) Prior Publication Data

US 2017/0115374 A1  Apr. 27, 2017

(51) Int. Cl.
| | |
|---|---|
| *G01S 3/02* | (2006.01) |
| *G01S 5/02* | (2010.01) |
| *H04B 17/309* | (2015.01) |
| *H04B 17/27* | (2015.01) |
| *H04B 17/318* | (2015.01) |

(52) U.S. Cl.
CPC .......... *G01S 5/0268* (2013.01); *G01S 5/0252* (2013.01); *H04B 17/27* (2015.01); *H04B 17/309* (2015.01); *H04B 17/318* (2015.01)

(58) Field of Classification Search
CPC ... G01S 5/0221; G01S 5/0226; H04W 64/003
USPC ........ 342/451, 457, 463–465; 455/67.11, 68, 455/456.1
See application file for complete search history.

(56) References Cited

U.S. PATENT DOCUMENTS

| 8,838,151 | B2 | 9/2014 | Tarlow et al. | |
|---|---|---|---|---|
| 9,344,992 | B2* | 5/2016 | Noonan | H04W 48/04 |
| 2010/0240392 | A1* | 9/2010 | Gerstenberger | G01S 5/0009 |
| | | | | 455/456.1 |
| 2013/0225209 | A1 | 8/2013 | Chen et al. | |

FOREIGN PATENT DOCUMENTS

| CN | 103402256 A | 11/2013 |
|---|---|---|
| CN | 103476115 A | 12/2013 |

OTHER PUBLICATIONS

V.V. Chirakkal et al., Navigating Through Dynamic Indoor Environments Using WIFI for Smartphones, 2014 IEEE Fourth International Conference on Consumer Electronics Berlin (ICCE-Berlin), Sep. 7-10, 2014, 376-378, IEEE, Berlin Germany. http://ieeexplore.ieee.org/xpl/articleDetails.jsp?tp=&arnumber=7034268&url=http%3A%2F%2Fieeexplore.ieee.org%2Fxpls%2Fabs_all.jsp%3Farnumber%3D7034268.

(Continued)

*Primary Examiner* — Dao L Phan
(74) *Attorney, Agent, or Firm* — Vazken Alexanian

(57) ABSTRACT

A computer-implemented method and a server for device positioning. The computer-implemented method includes sending a control message to a detector. The control message indicates a set of channels associated with an area and time periods for monitoring the set of channels. A measurement of a signal from a device for the area and a target device is received from the detector. Position of the target device with respect to the area is determined based on a measurement and a radio map. The radio map indicates signal strength corresponding to positions in the area.

14 Claims, 5 Drawing Sheets

(56) References Cited

OTHER PUBLICATIONS

H. Vathsangam et al., A Data-Driven Movement Model for Single Cellphone-Based Indoor Positioning, 2011 International Conference on Body Sensor Networks (BSN), May 23-25, 2011, 174-179, IEEE, Dallas, TX, US. http://ieeexplore.ieee.org/xpl/login.jsp?tp=&arnumber=5955318&url=http%3A%2F%2Fieeexplore.ieee.org%2Fxpls%2Fabs_all.jsp%3Farnumber%3D5955318.

Hyojeong Shin et al., Wi-Fi Fingerprint-Based Topological Map Building for Indoor User Tracking, 2010 IEEE 16th International Conference on Embedded and Real-Time Computing Systems and Applications (RTCSA), Aug. 23-25, 105-113, IEEE, Macau, SAR. http://ieeexplore.ieee.org/xpl/login.jsp?tp=&arnumber=5591303&url=http%3A%2F%2Fieeexplore.ieee.org%2Fxpls%2Fabs_all.jsp%3Farnumber%3D5591303.

Kamesh Namuduri et al., Dynamic Wi-Fi Fingerprinting Indoor Positioning System, 2014 International Conference on Indoor Positioning and Indoor Navigation, Oct. 27-30, 2014, Busan Korea. http://www.ipin2014.org/wp/pdf/4A-4.pdf.

\* cited by examiner

DEVICE POSITIONING

BACKGROUND

With the development of communication techniques, device positioning in a networking environment has been paid more and more attention, especially in places where Global Position System (GPS) is inadequate due to various causes such as multipath, signal blockage indoors, and so on. Among conventional solutions for device positioning, due to ubiquity of access points (APs) in buildings and urban areas, Wireless Fidelity (WiFi) positioning is becoming increasingly common for a variety of devices. Examples of such devices include, but are not limited to, mobile phones, tablets, personal digital assistants (PDAs), laptops, smart cameras, smart watches, smart glasses, and the like.

Conventionally, positioning schemes are generally classified into statistic schemes and dynamic schemes. The statistic schemes, such as propagation model approaches, determine positions of the devices according to three-point positioning methods and known positions of APs. Positioning accuracy of the statistic schemes depend on propagation attenuation models and thus is difficult to be guaranteed in different scenarios. The dynamic schemes, such as location fingerprints approaches, generally includes two stages, namely, an offline stage and an online stage. At the offline stage, a knowledge base is constructed. At the online stage, a radio map is dynamically generated based on the knowledge base, and a positioning system determines positions of the devices based on measured signal strength and the radio map. The dynamic schemes could capture time-adaptation of wireless signals and have better accuracy, thus they are widely used in practice. However, in a positioning system employing the dynamic schemes, users are generally required to additionally install a dedicated application (APP) on the devices.

SUMMARY

In one aspect, a computer-implemented method is provided. The method includes sending a control message to a detector. The control message indicates a set of channels associated with an area and time periods for monitoring the set of channels. At least one measurement of a signal from at least one reference device for the area and a target device is received from the detector, wherein the reference device is located at a predefined position with respect to the area, and the at least one measurement is obtained by the detector according to the control message. A position of the target device with respect to the area is determined based on the at least one measurement and a radio map. The radio map indicates signal strength corresponding to positions in the area.

In another aspect, a computer-implemented method is provided. The method includes receiving a control message from a positioning server. The control message indicates a set of channels associated with an area and time periods for monitoring the set of channels. At least one measurement of a signal from at least one of a reference device for the area and a target device is obtained according to the control message, wherein the reference device is located at a predefined position with respect to the area. The at least one measurement is reported to the positioning server for determining a position of the target device with respect to the area.

In another embodiment, a positioning server is provided. The positioning server includes one or more processors and a memory coupled to at least one of the processors. A set of computer program instructions are stored in the memory and executed by at least one of the processors in order to perform actions. The actions include sending a control message to a detector, the control message indicating a set of channels associated with an area and time periods for monitoring the set of channels; receiving, from the detector, at least one measurement of a signal from at least one of a reference device for the area and a target device, the reference device being located at a predefined position with respect to the area, the at least one measurement being obtained by the detector according to the control message; and determining a position of the target device with respect to the area based on the at least one measurement and a predetermined radio map, the radio map indicating signal strength corresponding to positions in the area.

It is to be understood that the Summary is not intended to identify key or essential features of embodiments of the present invention, nor is it intended to be used to limit the scope of the present invention. Other features of the present invention will become easily comprehensible through the description below.

BRIEF DESCRIPTION OF THE DRAWINGS

Through the more detailed description of some embodiments of the present disclosure in the accompanying drawings, the above and other objects, features and advantages of the present disclosure will become more apparent, wherein.

Throughout the drawings, same or similar reference numerals represent the same or similar element.

DETAILED DESCRIPTION

The present invention will now be described with reference to some example embodiments. It is to be understood that these embodiments are described only for the purpose of illustration and help those skilled in the art to understand and implement the present invention, without suggesting any limitations as to the scope of the invention. The invention described herein can be implemented in various manners other than the ones describe below.

As used herein, the term "includes" and its variants are to be read as opened terms that mean "includes, but is not limited to." The term "based on" is to be read as "based at least in part on." The term "one embodiment" and "an embodiment" are to be read as "at least one embodiment." The term "another embodiment" is to be read as "at least one other embodiment." Other definitions, explicit and implicit, can be included below.

Figure 1:
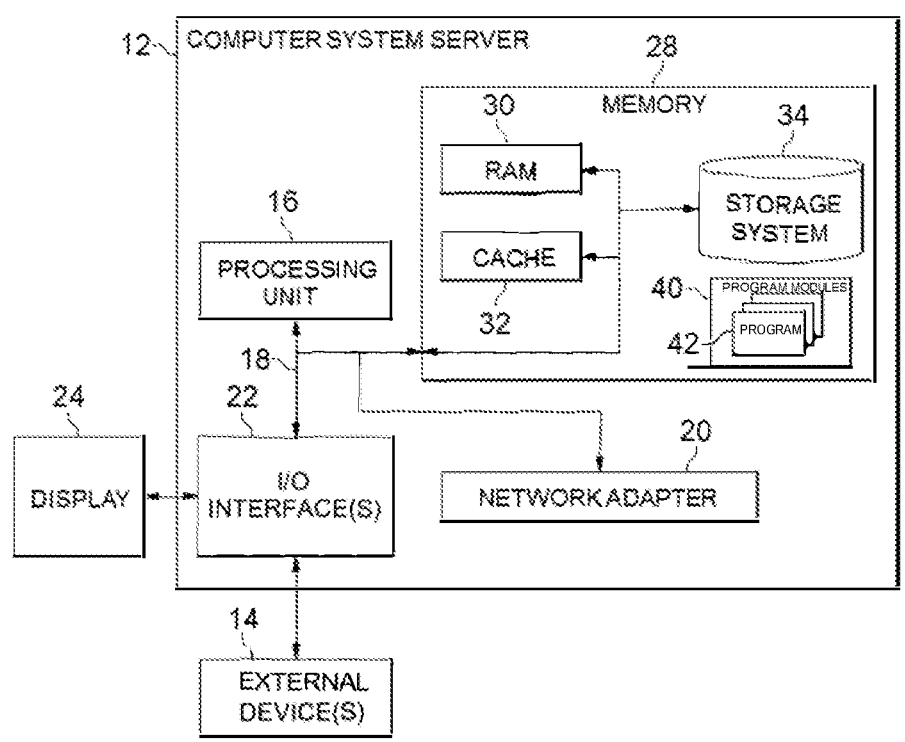
FIG. 1 is a block diagram of a device in which embodiments of the present invention can be implemented.

Reference is first made to FIG. 1, in which an exemplary device, referred to as computer system/server 12, which is applicable to implement the embodiments of the present invention is shown. Computer system/server 12 is only illustrative and is not intended to suggest any limitation as to the scope of use or functionality of embodiments of the invention described herein.

As shown in FIG. 1, computer system/server 12 is shown in the form of a general-purpose computing device. The components of computer system/server 12 can include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media can be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 can further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 can include at least one program product having a set (e.g., at least one) of program modules that are configured to carry out the functions of embodiments of the invention.

Program/utility 40, having a set (at least one) of program modules 42, can be stored in memory 28 by way of example, and not limitation, as well as an operating system, one or more application programs, other program modules, and program data. Each of the operating system, one or more application programs, other program modules, and program data or some combination thereof, can include an implementation of a networking environment. Program modules 42 generally carry out the functions and/or methodologies of embodiments of the invention as described herein.

Computer system/server 12 can also communicate with one or more external devices 14 such as a keyboard, a pointing device, a display 24, and the like. One or more devices that enable a user to interact with computer system/server 12; and/or any devices (e.g., network card, modem, etc.) that enable computer system/server 12 to communicate with one or more other computing devices. Such communication can occur via input/output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, and the like.

In computer system/server 12, I/O interfaces 22 can support one or more of various different input devices that can be used to provide input to computer system/server 12. For example, the input device(s) can include a user device such keyboard, keypad, touch pad, trackball, and the like. The input device(s) can implement one or more natural user interface techniques, such as speech recognition, touch and stylus recognition, recognition of gestures in contact with the input device(s) and adjacent to the input device(s), recognition of air gestures, head and eye tracking, voice and speech recognition, sensing user brain activity, and machine intelligence.

It is to be noted that the computer system/server 12 can be implemented as any suitable computing device, including but not limited to, a personal computer, a workstation, a mainframe, a midrange computer, a network appliance, a palm top computer, a telephony device, a blade computer, a hand held computer, and the like.

Figure 2:
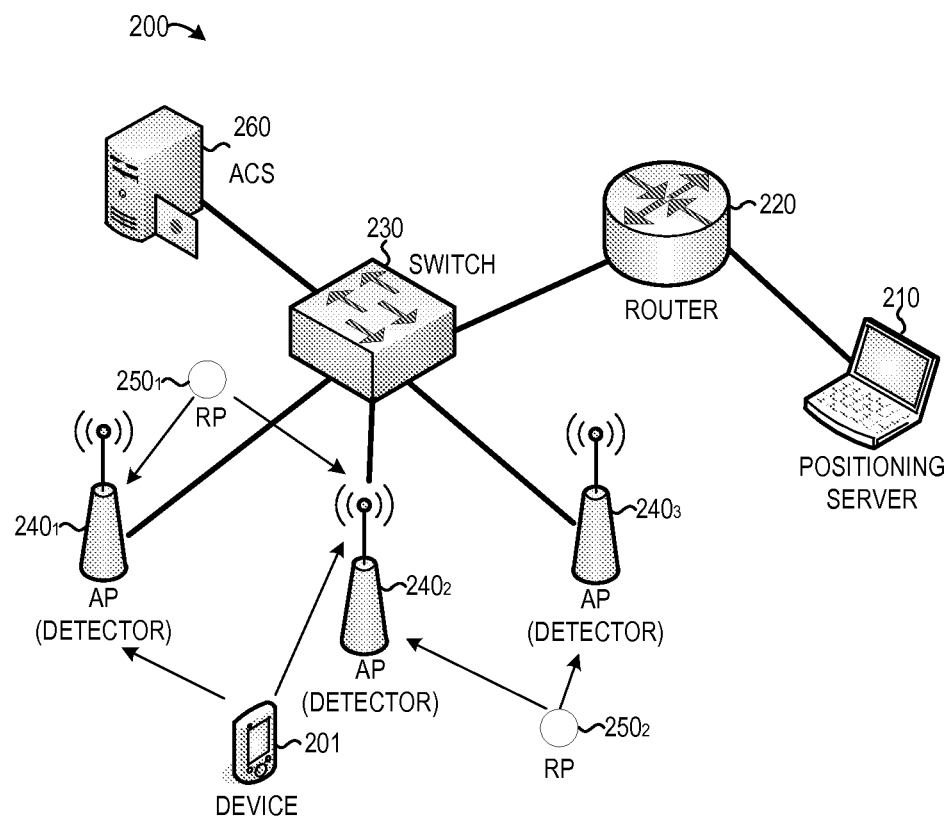
FIG. 2 is a schematic diagram of architecture of a positioning system in which embodiments of the present invention can be implemented.

FIG. 2 shows a schematic diagram of architecture of a positioning system 200 in which embodiments of the present invention can be implemented. The positioning system 200 can be arranged in a networking environment. Some embodiments will be discussed below with reference to an indoor environment, for example, within a building. Embodiments of the present invention can be applied in outdoor environment as well. As shown in FIG. 2, the positioning system 200 includes a positioning server 210, a router 220, a switch 230, a plurality of APs $240_1$, $240_2$, and $240_3$ (collectively referred to as the APs 240), a plurality of reference devices or reference points (RPs) $250_1$ and $250_2$ (collectively referred to as the RPs 250), and an Access Control Server (ACS) 260. In the positioning system 200, the positioning server 210 can be connected to an external network (not shown) such as the Internet. As such, while a device 201 accesses the Internet via the AP 240, the position of the device 201 can be determined by the positioning system 200. For the sake of discussion, in the following, the device 201 is also referred to as the "target device."

The APs 240 can communicate with the positioning server 210 via the router 220 and the switch 230. The ACS 260 implements access control such as authentication, authorization and the like. Functionalities of the router 220, switch 230 and ACS 260 are known and thus will not be detailed herein. The RPs 250 are devices located at respective predefined positions in the system 200. In operation, the RPs 250 work with the APs 240 and the positioning server 210 to detect positions of one or more devices, which will be discussed in the following paragraphs.

Conventionally, if the positioning system 200 employs the dynamic schemes, a user has to download and install on his/her device 201 an application that is dedicated to positioning in the positioning system 200. In practice, it is often inconvenient for the user to install the dedicated application. If the user does not install the dedicated application, synchronization between the RPs 250 cannot be guaranteed.

In accordance with embodiments of the present invention, the need of installing applications on the device 201 is eliminated. In some embodiments, a detector can be implemented at an AP 240. Specifically, the AP 240 can act as the detector. For the sake of discussion, in the following discussion, such a detector is referred to as the detector 240. It is to be understood that in alternative embodiments, the detector can be implemented as an independent node or device in the positioning system 200. The detector 240 detects signals according to a control message specified by the positioning server 210, and reports measurements on the detected signals to the positioning server 210. Based on the received measurements, the positioning server 210 determines the position of the device 201.

At the offline stage, the detector 240 detects signals from a testing point (not shown) and the RPs 250 on each channel specified by the control message for a specified period of time. Upon receipt of measurements on the detected signals from the detector 240, the positioning server 210 can generate the knowledge base based on the measurements.

At the online stage, the detector 240 detects signals from the device 201 and the RPs 250 according to the same control message and reports the corresponding measurements to the positioning server 210. The positioning server 210 can generate a radio map based on signals currently received from the RPs 250 and the knowledge base, and then determine the position of the device 201 based on the measurements and the radio map. In this way, synchronization between the RPs 250 is guaranteed. As such, the device 201 can be positioned in an accurate way, without reliance on installation of any dedicated application(s).

In some embodiments, examples of the device 201 include, but are not limited to, a mobile terminal, a tablet, a PDA, a laptop, a smart camera, a smart watch, a smart glass, and other suitable device that includes networking capability, for example, WiFi capability. In some embodiments, the positioning server 210 can be implemented as the computer system/server 12 shown in FIG. 1 or any other suitable computing device, either known at present or to be developed in the future.

It is to be understood that the configurations of FIG. 2 is described merely for the purpose of illustration, without suggesting any limitation as to the scope of the invention. Those skilled in the art will appreciate that various other configurations of components in the positioning system 200 are contemplated.

Figure 3:
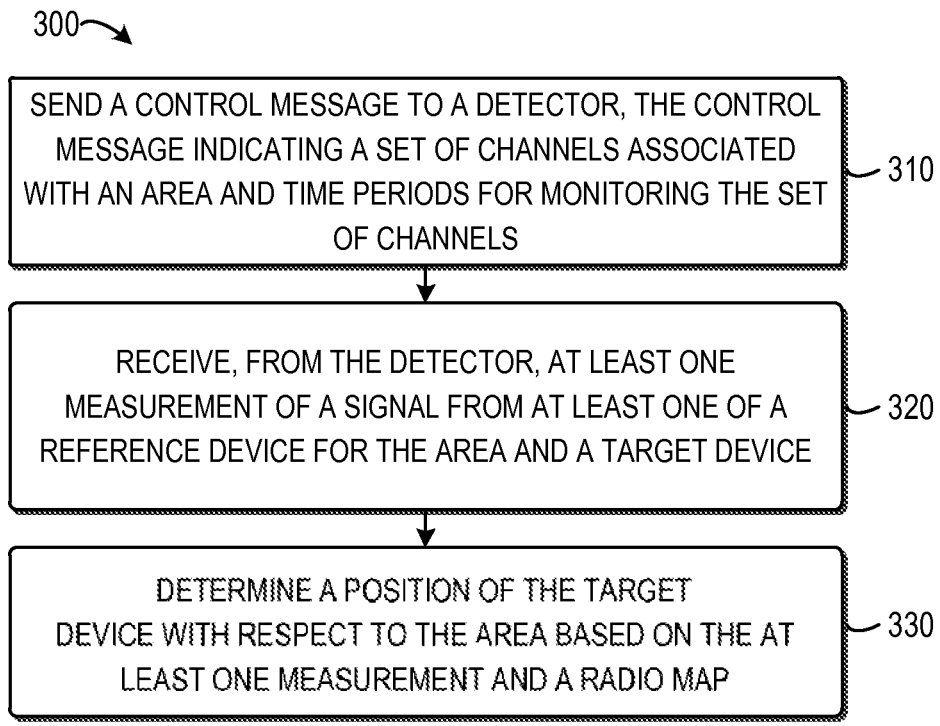
FIG. 3 is a flow chart of a method for device positioning at a positioning server in accordance with embodiments of the present invention.

Now some example embodiments of the present invention will be described. Reference is made to FIG. 3, which illustrates a flow chart of a method 300 for device positioning in accordance with embodiments of the present invention. The method 300 can be at least in part implemented by the positioning server 210 of the positioning system 200, for example.

The method 300 is entered in step 310, where a control message is sent to a detector. The control message can be implemented as a message that carries information about a set of channels associated with an area and time periods for monitoring the set of channels. In accordance with embodiments of the present invention, the positioning system 200 can be applied to an environment (for example, a building) for positioning the device(s) therein. The space can include at least one area, and each area can be further divided into at least one zone. In other words, an area is a portion of the space, and a zone is a portion of the area. The areas and zones can have different shapes including, but not limited to, cube, sphere, or any other regular or irregular shapes.

Among the areas, radio resources such as channels or frequency bands can be allocated in various ways. An area can have its own specific channel(s). In addition, or alternatively, the area can share one or more channels with other areas. The detector 240 can detect signals on the channels dynamically and periodically. In some embodiments, prior to step 310, the positioning server 210 can first determine a control message for an area so as to send the control message to the detector 240. Thus, the detector 240 can detect signals based on the control message. Embodiments of generation of the control message will be discussed with reference to FIG. 4.

In some embodiments, in the determination of the control message, the positioning server 210 can obtain channel configuration of the area and its adjacent area(s). The channel configuration of an area indicates information about channels allocated to the area. In an embodiment, the positioning server 210 can send to the detector 240 a request for the channel configuration. In response, the detector 240 scans frequency resources of the area and report the channel configuration to the positioning server 210. Alternatively, in another embodiment, the detector 240 can be configured to periodically obtain and store the channel configuration in a storage device accessible to the positioning server 210. In such an embodiment, in step 310, the positioning server 210 can obtain the channel configuration from the storage device.

With the channel configuration, the positioning server 210 can determine the channels allocated to the area and the channels allocated to each of the adjacent area(s). Accordingly, the positioning server 210 can determine a set of channels associated with the area and the adjacent area(s), for example, by selecting one or more channels allocated to the area and one or more channels allocated to an adjacent area. For each of those channels, the positioning server 210 determines a time period to indicate how long the channel is to be monitored. In some embodiments, time periods for different channels can be different or the same. With the set of channels and the determined time period(s), the positioning server 210 can generate the control message and send it to the detector 240.

Figure 4:
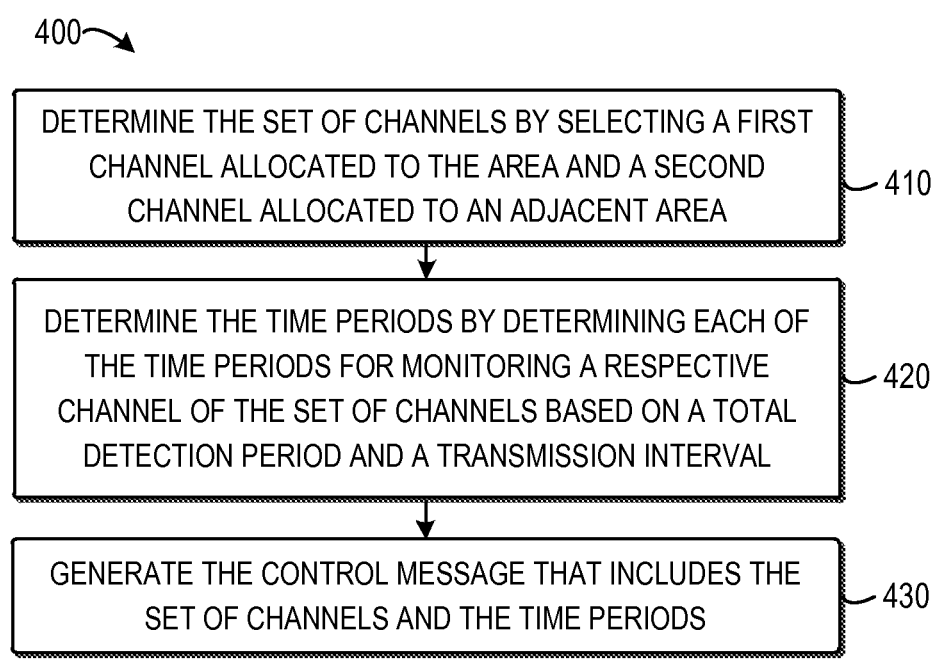
FIG. 4 is a flow chart of a method for determining a control message in accordance with further embodiments of the present invention.

Now some example embodiments of the control message determination will be described. FIG. 4 is a flow chart of a method 400 for determining a control message in accordance with further embodiments of the present invention. The method 400 can be considered as an implementation of step 310 of the method 300. It is to be understood that step 310 of the method 300 can be implemented in several ways as discussed above, and the method 400 is only one example instead of limitation.

Figure 5:
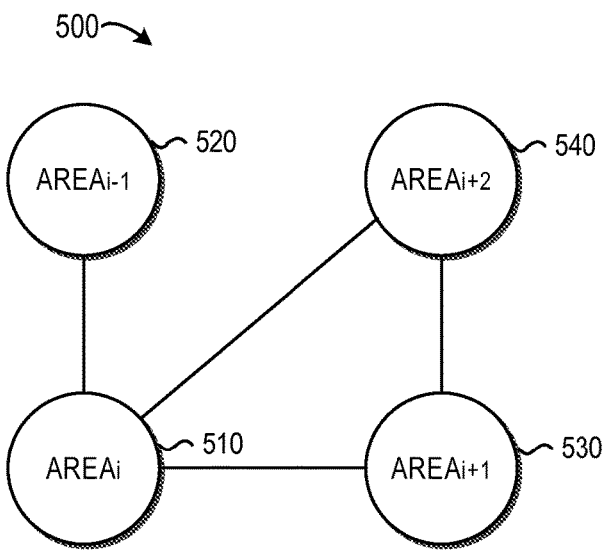
FIG. 5 is a schematic diagram of a graphical representation of determination of candidate channels in accordance with embodiments of the present invention.

The method 400 is entered in step 410, the set of channels is determined by selecting a first channel allocated to the area and a second channel allocated to an adjacent area. For the sake of discussion, the channels in the determined set of channels are sometimes referred to as the "candidate channels" in the following discussion. FIG. 5 is a schematic diagram of a graphical representation of determination of candidate channels in accordance with embodiments of the present invention. In the example shown in FIG. 5, the area discuss above is denoted as $area_i$ 510, and it has three adjacent areas, namely, $area_{i-1}$ 520, $area_{i+1}$ 530 and $area_{i+2}$

540. It is supposed that the area$_i$ 510 is allocated with n$_{ch}$(i) channels and the adjacent area 520, 530 and 540 are allocated with n$_{ch}$(i−1), n$_{ch}$(i+1) and n$_{ch}$(i+2) channels, respectively. For sake of discussion, n$_{ch}$(i−1), n$_{ch}$(i+1) and n$_{ch}$(i+2) are collectively referred to as n$_{ch}$(i$_{adj}$) in the following discussion. From the channel configuration, the positioning server 210 can determine n$_{ch}$(i) and n$_{ch}$(i$_{adj}$) channels, respectively, and can further determine the set of channels to be detected, namely candidate channels, by combining n$_{ch}$(i) and n$_{ch}$(i$_{adj}$) as follows:

$$N_i = |n_{ch}(i) \cup n_{ch}(i_{adj})| \quad (1)$$

where N$_i$ represents the number of the candidate channels; "|•|" represents an operation of calculating an absolute value; and "∪" represents an operation of union.

In step 420, the time periods are determined by determining each of the time periods for monitoring a respective channel of the set of channels based on a total detection period for monitoring the set of channels and a transmission interval for transmitting reference signals by the reference device. The total detection period is a predetermined time period for monitoring all the candidate channels. In the discussed example, it is supposed that the total detection period for the area$_i$ 510 is T. In some embodiments, the time period (denoted as Tch$_i^j$) for detecting on the j$^{th}$ candidate channel can be determined as:

$$Tch_i^j = I_i^j \frac{\lambda T}{n_{ch}(i)} + I_{adj}^j \frac{(1-\lambda)T}{n_{ch}(i_{adj})}, \quad (2)$$

where λ represents a smoothing factor and can be set as a value between 0 and 1, which is capable of adjusting the length of the time period assigned for monitoring the j$^{th}$ candidate channel; and I$_i^j$ is a weighting factor and can be defined as:

$$I_i^j = \begin{cases} 1 & \text{if } j \in \text{area}(i) \\ 0 & \text{if } j \notin \text{area}(i) \end{cases}. \quad (3)$$

In addition, it is to be understood that each of the time periods determined in step 420 should be larger than a transmission interval for transmitting the reference signals by the reference point. If the time period calculated by equation (3) is less than the transmission interval, the time period can be lengthened accordingly. This is to ensure that the positioning server 210 can obtain the reference signals during detection of one candidate channel, and thus the accuracy of the positioning result can be guaranteed. Based on the set of channels and the time period determined in steps 410 and 420, the positioning server 210 can generate the control message in step 430 and send it to the detector 240.

Upon receipt of the control message from the positioning server 210, the detector 240 can detect signal(s) on the set of channels indicated in the control message for the time periods specified in the control message. The signal(s) can include a communication signal transmitted by the device 201, a reference signal transmitted by the RP 250, or both of them. Then, the detector 240 can measure the detected signals and report one or more measurements to the positioning server 210.

Still in reference to method 300, in step 320, at least one measurement of a signal from at least one of a reference device for the area and a target device can be received from the detector. The received measurement(s) can be those measured by the detector 240 according to the control message and can include information about strength of the received signal. Thus, upon receipt of the measurement(s), the positioning server 210 can determine the strength of the received signal so as to position the device 201.

In some embodiments, the detector 240 obtains a plurality of measurements by measuring a channel at a time period specified in the control message for the channel. Then, the detector 240 can determine strength of the signal based on the plurality of measurements and a predetermined time window, and send a measurement indicating the strength of the signal to the positioning server 210. In response, in step 320, the positioning server 210 receives the measurement from the detector 240. In this case, the measurement can indicate strength of signals both from the RPs 250 and the target device 201 or strength of a signal only from the RPs 250.

In some embodiments, after the detector 240 measures a channel at a time period specified in the control message for the channel, it sends a corresponding measurement to the positioning server 210, instead of determining the strength of the signal by itself. In this case, a measurement can indicate strength of signals from the RPs 250, the target device 201 or both of them. For example, if a measurement is obtained by measuring a channel (named "CHANNEL 1") and a RP 250 is transmitting reference signals on CHANNEL 1, it is determined that the measurement is associated with a signal from a reference device. If a measurement is obtained by measuring another channel (named "CHANNEL 2") and the target device 201 is transmitting signals on CHANNEL 2, it is determined that the measurement is associated with a signal from the target device 201. Furthermore, if a measurement is obtained by measuring a channel (named "CHANNEL 1") and both a RP 250 and the target device 201 are transmitting signals on CHANNEL 1, it is determined that the measurement is associated with a signal from the RP 250 and the target device 201. Thus, in step 320, the positioning server 210 can receive a plurality of measurements of a signal from at least one of the RP 250 and the target device 201, and determine the strength of the signal based on the measurements and a predetermined time window, as discussed below.

Next, in step 330, a position of the target device with respect to the area is determined based on the at least one measurement and a radio map. In some embodiments, a measurement can include a received signal strength indicator (RSSI). Upon receipt of the measurement, the positioning server 210 can extract the RSSI and determine the strength of the received signal based thereon. Alternatively, in some embodiments, in addition to the RSSI, the measurement can further include a timestamp indicating a time instant at which the measurement is obtained and/or other related information. The related information can include, for example, a source address that indicates the channel on which the measurement is obtained. When the positioning server 210 receives the measurement, it can determine whether the measurement can be used to determine the strength of the signal based on the timestamp. For instance, if the timestamp of the measurement indicates that the measurement is obtained recently, the positioning server 210 can use the measurement to determine the strength of the signal. Otherwise, the positioning server 210 can discard the measurement. More details can be found in following descriptions with respect to FIG. 6.

Figure 6:
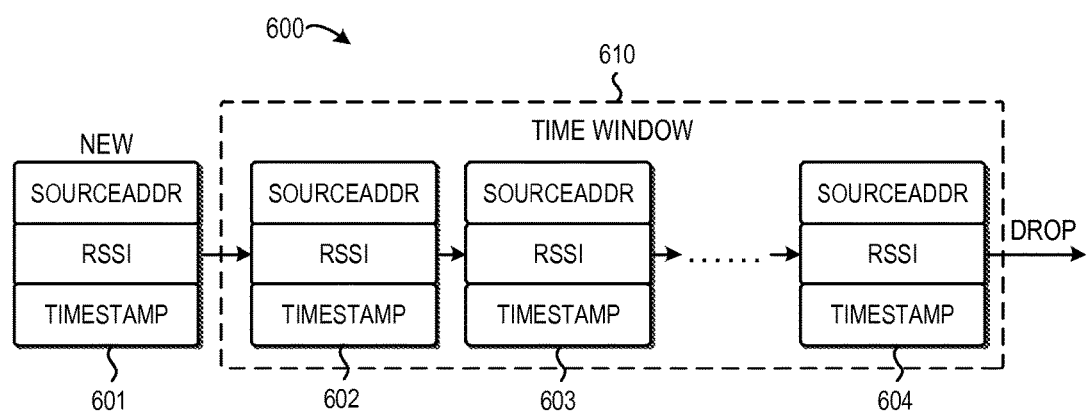
FIG. 6 is a schematic diagram of a graphical representation of determination of a set of measurements in accordance with embodiments of the present invention.

FIG. 6 is a schematic diagram of a graphical representation of determination of a set of measurements in accordance with embodiments of the present invention. In the example shown in FIG. 6, the positioning server 210 can use a time window to select a set of measurements for use in determination of the strength of the signal. The time window is set as being larger than the total detection period for the area. As shown in FIG. 6, upon receipt of a new measurement 601 from the detector 240, the positioning server 210 can store it into a buffer, and combine measurements 602, 603 and 604 that have the same source addresses. In an embodiment, if the source address of a new measurement 601 is different from source addresses of all measurements in the buffer, then the positioning server 210 can set up a new set for the new measurement. In this case, the strength of the signal (denoted as "rssi") can be determined as the RSSI indicated by the new measurement (denoted as "$rssi_{new}$"):

$$rssi = rssi_{new}, \quad (4)$$

and the timestamp of the new set (denoted as "timstamp") can be set as the timestamp indicated in the new measurement (denoted as "$t_{new}$"):

$$timestamp = t_{new}. \quad (5)$$

If the source address of a new measurement 601 is the same as the source address of a set of measurements 602 to 604 in the buffer, the positioning server 210 can place the new measurement 601 into the set and determine the time span between the timestamp of the set and the timestamp of the new measurement 601. In an embodiment, the timestamp of the set can be determined as the timestamp of the newest measurement in the set. If the time span is not larger than the time window, the positioning server 210 can determine the strength of the signal (denoted as "rssi") as follows:

$$rssi = \qquad (6)$$
$$\left(\alpha - \frac{(t_{new} - t_{old}) \cdot \alpha}{T_{drop}}\right) \cdot rssi_{old} + \left[1 - \left(\alpha - \frac{(t_{new} - t_{old}) \cdot \alpha}{T_{drop}}\right)\right] \cdot rssi_{new}$$

where $t_{new}$ represents the timestamp indicated in the new measurement 601;

$rssi_{new}$ represents the RSSI indicated in the new measurement 601;

$t_{old}$ represents the timestamp of the set;

$rssi_{old}$ represents the old strength of the signal determined based on of the measurements 602-604 in the set at the timestamp of $t_{old}$;

$T_{drop}$ represents the time window; and $\alpha$ represents an adjusting factor, wherein $0<\alpha<1$. If $\alpha$ is smaller, it means that the strength of the signal is determined mostly based on the new measurement 601. If $\alpha$ is larger, it means that the strength of the signal is determined mostly based on the old measurements 602-604.

On the other hand, if the time span is larger than the time window, the positioning server 210 can remove all the measurements from the set and place the new measurement into the set. In this case, the strength of the signal and the timestamp of the set can be determined as the RSSI and timestamp of the new measurement 601, as shown in equations (4) and (5). In this way, the measurements used by the positioning server 210 can be updated constantly and accuracy of the positioning can be improved.

Still in reference to FIG. 3, the radio map used in step 330 can be determined based on a predetermined knowledge base and signals currently received from the RPs 250. The knowledge base can include information about a relationship between signal strength and positions in the area. The knowledge base can be obtained in several ways. In some embodiments, the knowledge base can be constructed by the positioning server 210 at the offline stage. The offline stage can be performed at any appropriate time before the start of method 300, especially step 330. At the offline stage, the detector 240 can detect signal(s) according to the channel message and report corresponding measurement(s) to the positioning server 210. For the sake of discussion, such measurement(s) can be sometimes referred to as the "testing measurement(s)." Different from the online stage, the detector 240 can detect, at the offline stage, a testing signal transmitted by a testing device or point and the reference signal transmitted by the RP 250. The testing point can be a device similar to the device 201, with transmission power and position known to the positioning server 210. When the testing point is placed in a zone of the area, the detector 240 can report the testing measurements to the positioning server 210. Based on the testing measurements, the positioning server 210 can determine the signal strength. In some embodiments, the time window discussed with reference to FIGS. 4 and 5 can be also applied to the determination of the signal strength. Then the positioning server 210 can establish a relationship between the signal strength and the position of the testing point (for example, a zone in the area). By placing the testing device in different zones, the relationship between the signal strength and all zones of the area can be established. In this way, the knowledge base can be constructed.

Alternatively, in some embodiments, the knowledge base can be constructed in other ways or by other server or controller in the positioning system 200. After the knowledge base is constructed, it can be stored in a storage device accessible to the positioning server 210. Thus, the positioning server 210 can obtain the knowledge base from the storage device in step 330.

With the knowledge base, the positioning server 210 can determine the radio map based thereon. In some embodiments, the positioning server 210 can obtain strength of reference signals from the RPs 250 periodically or at a time instant before determining the position of the device 201. Then, the positioning server 210 can generate the radio map based on the knowledge base and the strength of the reference signals. In this way, the radio map can be generated dynamically based on the current reference signals.

In some embodiments, if the reference signals are not received from the RPs 250, the radio map can be also generated, for example based on previously received reference signals, predetermined reference signals, or other suitable signals.

In accordance with embodiments of the present invention, in step 330, after obtaining the strength of the signal and the radio map, the positioning server 210 can determine the position of the device 201 with respect to the area. For instance, if the device 201 is located in a target zone of the area, when the positioning server 210 matches the strength of the signal with the signal strength of the radio map, it can determine the target zone based on the matched result. On the other hand, if the target zone does not belong to the area, the positioning server 210 can not find the matched result, and can determine that the device 201 is not located in the current area. That is, in step 330, the determined position of the target device with respect to the area can indicate that the target device locates in the target zone in the area or the target device does not locate in the area. In this way, it is possible to avoid installation of dedicated application(s) on the device 201 while positioning the device 201 in an accurate and efficient way.

It is to be understood that the above is described only for the purpose of illustration to help those skilled in the art to understand the present invention, without suggesting any limitations as to the scope of the invention. It would be appreciated that there can be multiple ways to determine the position of the device 201 based on the strength of the signal and the radio map, and descriptions are not detailed here to avoid obscurity of the subject matter of the present invention.

In addition, embodiments of the present invention can further establish a fault-tolerant mechanism to handle exceptions occurred at the detector 240 and the RP 250, for example. In some embodiments, the RP 250 can be recovered from a failure, such as rebooted, fault repaired, replaced with a new RP, and so on. In response, the positioning server 210 can determine a transmission interval. The transmission interval is an interval between transmissions of two reference signals (for example, ping packets) from the RP 250. Then the positioning server 210 can send the transmission interval to the RP 250 to configure the RP 250 to transmit reference signals according to the transmission interval. The determined transmission interval can be less than each of the time periods. In other words, the interval for the RP 250 to transmit every two reference signals is less than the minimum time period for detecting on a channel in the set of channels. As such, signals can be successfully detected on each one of the set of channels. It would be appreciated that the above mechanism is applicable in the case that a new RP is deployed. That is, whenever a RP is added, the RP can be configured according to the configurations of the relevant RPs.

In addition, or alternatively, in response to that the detector 240 is recovered from a failure, the positioning server 210 can determine a further detector, which is also referred to as the "associated detector" for the sake of discussion. The associated detector can detect reference signals which are also detected by the detector 240. In other words, both the detector 240 and the associated detector can detect reference signals from the same RP 250. In some embodiments, if a first detector is associated with a second detector and the second detector is associated with a third detector, it can be determined that first detector is also associated with the third detector. After determining the associated detector, the positioning server 210 can obtain a set of parameters of the associated detector. The set of parameter are related to reporting of the measurement(s) to the positioning server 210 and can include, for example, a reporting time instant, a reporting interval, and so on. The reporting time instant can be a time instant at which the associated detector starts to report the measurement of the signals. The reporting interval can be a time interval between reporting of two measurements. In some embodiments, the positioning server 210 can directly consider the reporting time instant and the reporting interval of the associated detector as those of the recovered detector 240, so that the recovered detector 240 can report measurements in synchronization with the associated detector. In this way, the positioning server 210 can receive measurements from the detector 240 and the associated detector synchronously, and can determine the position of the device 201 more accurately. Likewise, when a new detector is added to detect reference signals from a RP, the detector can be configured according to the configurations of the relevant existing detector(s).

In some embodiments, if there are two or more associated detectors, the positioning server 210 can determine an average of reporting time instants and reporting intervals of the associated detectors as the reporting time instant and the reporting interval of the recovered detector 240. As such, the recovered detector 240 can report measurements substantially in synchronization with the associated detectors. It can be understood that, the above example are described for illustration, rather than limitation. For instance, the positioning server 210 can determine a maximum value, a minimum value or a suitable intermediate value of reporting time instants of the associated detectors as the report time instant of the recovered detector 240. Likewise, the reporting interval of the recovered detector 240 can be determined in a similar way.

After determining the set of parameters related to reporting of the measurement(s) for the recovered detector 240, the positioning server 210 can send them to the recovered detector 240. In some embodiments, the set of parameters can be sent together with or independent of the control message. As such, the recovered detector 240 can detect the set of channels according to the control message and report the measurements to the positioning server 210 according to the report time instant and the reporting interval.

Figure 7:
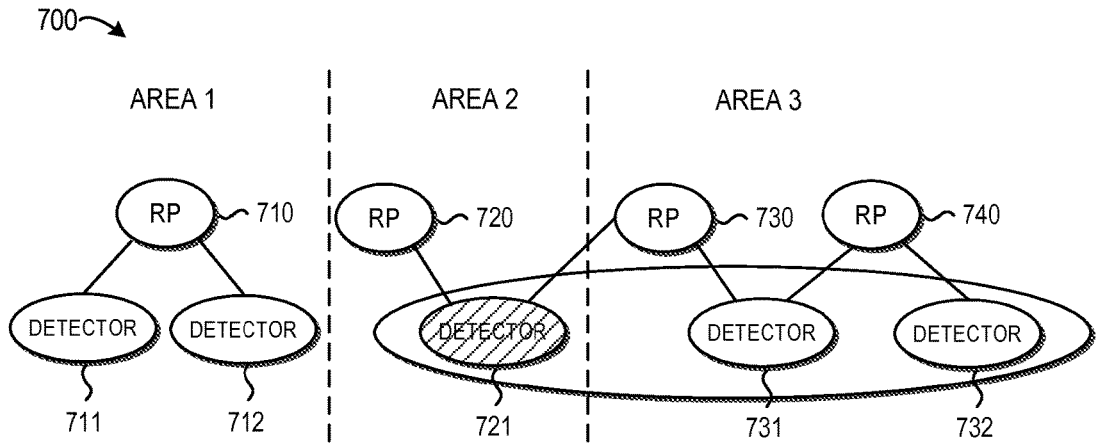
FIG. 7 is a schematic diagram of a graphical representation of a process of detector recovery in accordance with embodiments of the present invention.

Example embodiments of recovery of the detector 240 will be described. FIG. 7 is a schematic diagram of a graphical representation of a process 700 of detector recovery in accordance with embodiments of the present invention. The example of FIG. 7 shows three areas, namely, area 1, area 2 and area 3. As shown, there is a RP 710 and two detectors 711 and 712 associated with area 1, a RP 720 and a detector 721 associated with area 2, and two RPs 730 and 740 and two detectors 731 and 732 associated with area 3. In the example of FIG. 7, reference signals transmitted by the RP 710 are detected by the detectors 711 and 712, reference signals transmitted by the RP 720 are detected by the detector 721, reference signals transmitted by the RP 730 are detected by the detectors 721 and 731, and reference signals transmitted by the RP 740 are detected by the detectors 731 and 732. In the shown example, supposing that a failure occurs at the detector 721, it can be determined that the detector 731 is an associated detector of the detector 721. Furthermore, since the reference signals detected by the associated detector 731 are also detected by the detector 732, it can be determined that the detector 732 is also an associated detector of the detector 721. In this way, a cut set is formed by the detector 721 and its associated detectors 731 and 732.

When the detector 721 is recovered from the failure, the positioning server 210 can calculate an average of the reporting time instants of the associated detectors 731 and 732 as a new reporting time instant of the recovered detector 721, and calculate an average of the reporting intervals of the associated detectors 731 and 732 as a new reporting interval of the recovered detector 721. Then, the positioning server 210 can send the new reporting time instant and the new reporting time instant, as well as the control message, to the recovered detector 721. In some embodiments, the new reporting time instant and the new reporting time instant can be included in the control message or can be sent as an independent signaling to the recovered detector 721.

Figure 8:
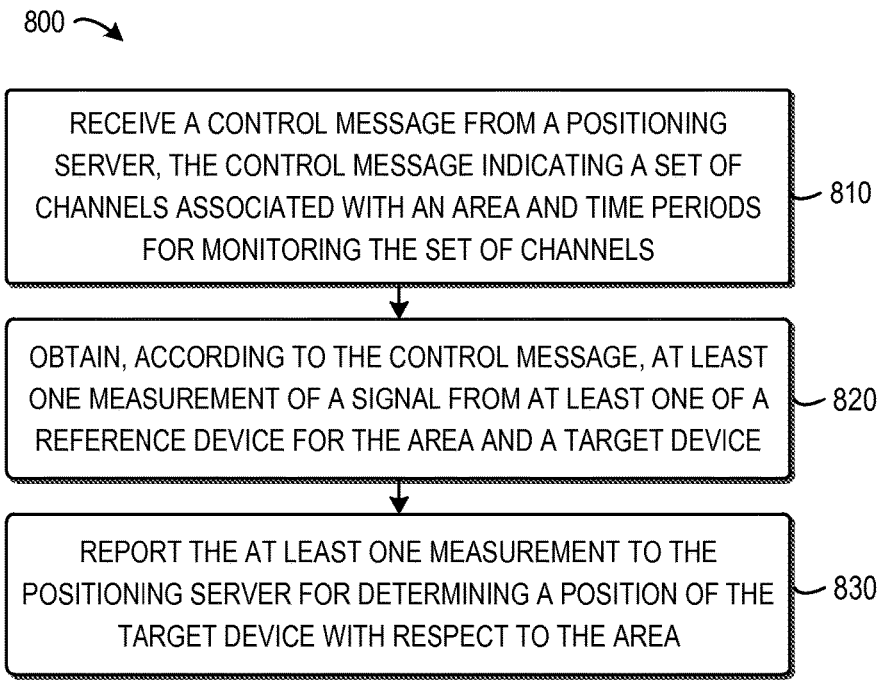
FIG. 8 is a flow chart of a method for device positioning at a detector in accordance with embodiments of the present invention.

FIG. 8 shows a flow chart of a method 800 for device positioning at a detector in accordance with embodiments of the present invention. The method 800 can be at least in part implemented by the detector 240 of the positioning system 200, for example. In step 810, where a control message for an area is received from a positioning server. The control message can be determined by the positioning server 210 as discussed with reference to step 310 of the method 300. According to the control message, the detector 240 can determine a set of channels associated with an area and time periods for monitoring the set of channels. Accordingly, the detector 240 can detect signal(s) on each channel of the set for a respective time period. In some embodiments, the signal(s) can include a communication signal transmitted by the device 201, a reference signal transmitted by the RP 250 or both of them.

Next, in step 820, at least one measurement of a signal from at least one of a reference device for the area and a target device is obtained according to the control message. In some embodiments, the detector 240 can determine the set of channels and the time periods for monitoring the set of channels from the control message. Then, the detector 240 can monitor each of the set of channels during a respective time period of the time periods. The signals can be transmitted from the device 201, the RP 250, or both of them. Next, the detector 240 can generate one or more measurements at a predetermined interval by measuring on the monitored channel. For example, the measurements can be implemented in the form of the measurements 601 to 604, as shown in FIG. 6. Next, in step 830, the at least one measurement is reported to the positioning server for determining a position of the target device with respect to the area.

In some embodiments, the detector 240 can obtain a plurality of measurements by measuring a channel at a time period specified in the control message for the channel. Then, the detector 240 can determine strength of the signal based on the plurality of measurements and a predetermined time window, and report a measurement indicating the strength of the signal to the positioning server 210 in step 830. Alternatively, in some embodiments, after the detector 240 measures a channel at a time period specified in the control message for the channel, it sends a corresponding measurement to the positioning server 210, instead of determining the strength of the signal by itself.

In some embodiments, the detector 240 can obtain, from the positioning server, a set of parameters related to reporting of the at least one measurement. The set of parameters can be determined by the positioning server for synchronization and can include, for example, a reporting time instant, a reporting interval, and so on. Then, the detector 240 can report the at least one measurement according to the set of parameters. Upon receipt of the at least one measurement from the detector 240, the positioning server 210 can determine the position of the device 201 based on the measurement(s) and the radio map.

In addition to the above, optionally, at the offline stage, the detector 240 can detect signals and report measurement (s) as well. In some embodiments, the detector 240 can obtain one or more testing measurements of signals according to the control message. The signals can include a testing signal transmitted by a testing point and the reference signal transmitted by the RP 250. In some embodiments, the detector 240 can monitor each of the set of channels during a respective time period of the time periods and measuring on the monitored channel. Thus, the testing measurement(s) can be obtained. Then the detector 240 can report the testing measurement(s) to the positioning server 210, so that the positioning server 210 can construct the knowledge base based thereon.

In some embodiments, optionally, prior to receiving the control message, the detector 240 can send information about channels allocated to the area and an adjacent area to the positioning server 210. Upon receipt of the information, the positioning server 210 can generate the control message based thereon.

The present invention can be a method, a device, an apparatus, and/or a computer program product. The computer program product can include a computer readable storage medium (or media) having computer readable program instructions thereon for causing a processor to carry out aspects of the present invention. The computer readable storage medium can be a tangible device that can retain and store instructions for use by an instruction execution device. The computer readable storage medium can be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a RAM, a ROM, an EPROM or Flash memory, a SRAM, a portable CD-ROM, a DVD, a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network can include copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention can be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++ or the like, and procedural programming languages, such as the "C" programming language or similar programming languages. The computer readable program instructions can execute entirely on the user's computer, partly on the user's computer, as a stand-alone software package, partly on the user's computer and partly on a remote computer or entirely on the remote computer or server. In the latter scenario, the remote computer can be connected to the user's computer through any type of network, including a local area network (LAN) or a wide area network (WAN), or the connection can be made to an external computer (for example, through the Internet using an Internet Service Provider). In some embodiments, electronic circuitry including, for example, programmable logic circuitry, field-programmable gate arrays (FPGA), or programmable logic arrays (PLA) can execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions can be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions can also be stored on a computer readable storage medium that can direct a computer, a programmable data processing apparatus, and/or other devices to function in a particular manner, such that the computer readable storage medium having instructions stored therein includes an article of manufacture including instructions which implement aspects of the function/act specified in the flowchart and/or block diagram block or blocks.

The computer readable program instructions can also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams illustrate the architecture, functionality, and operation of possible implementations of systems, methods and computer program products according to various embodiments of the present invention. In this regard, each block in the flowchart or block diagrams can represent a module, snippet, or portion of code, which includes one or more executable instructions for implementing the specified logical function(s). It should also be noted that, in some alternative implementations, the functions noted in the blocks can occur out of the order noted in the Figures. For example, two blocks shown in succession can, in fact, be executed substantially concurrently, or the blocks can sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method comprising:
   sending a control message to a detector, the control message indicating a set of channels associated with an area and time periods for monitoring the set of channels;
   receiving, from the detector, at least one measurement of a signal from at least one reference device for the area and a target device, the reference device being located at a predefined position with respect to the area, the at least one measurement being obtained by the detector according to the control message; and
   determining a position of the target device with respect to the area based on the at least one measurement and a radio map, the radio map indicating signal strength corresponding to positions in the area.

2. The method of claim 1, further comprising:
   determining the set of channels by selecting a first channel allocated to the area and a second channel allocated to an adjacent area;
   determining the time periods by determining each of the time periods for monitoring a respective channel of the set of channels based on a total detection period for monitoring the set of channels and a transmission interval for transmitting reference signals by the reference device; and
   generating the control message that includes the set of channels and the time periods.

3. The method of claim 1, wherein determining the position of the target device with respect to the area comprises:
   determining a set of measurements from the at least one measurement of the signal based on a time window that is larger than a total detection period for monitoring the set of channels;
   determining strength of the signal based on the set of measurements; and
   determining the position of the target device with respect to the area based on the strength of the signal and the radio map.

4. The method of claim 1, further comprising:
   determining a transmission interval that is less than each of the time periods; and
   sending the transmission interval to the reference device to configure the reference device to transmit reference signals according to the transmission interval.

5. The method of claim 1, further comprising:
   obtaining a first set of parameters of the detector related to reporting of the at least one measurement in response to a further detector being added to detect reference signals from the reference device;
   determining, based on the first set of parameters, a second set of parameters of the further detector related to reporting of at least one measurement made by the further detector; and
   sending the second set of parameters to the further detector to synchronize the reporting of the detector and the reporting of the further detector.

6. The method of claim 1, further comprising:
   obtaining a predetermined knowledge base indicating a relationship between signal strength and the positions in the area; and determining the radio map based on the knowledge base and a signal from the reference device.

7. The method of claim 6, wherein obtaining the predetermined knowledge base comprises:
receiving, from the detector, a testing measurement of signals from a testing device and the reference device, the testing measurement being obtained by the detector according to the control message, the testing device being located in a position of the area;
determining signal strength based on the testing measurement; and
generating the knowledge base by determining a relationship between the signal strength and the position of the testing point.

8. A positioning server, comprising:
one or more processors;
a memory coupled to at least one of the processors; and
a set of computer program instructions stored in the memory and executed by at least one of the processors in order to perform actions including:
sending a control message to a detector, the control message indicating a set of channels associated with an area and time periods for monitoring the set of channels;
receiving, from the detector, at least one measurement of a signal from at least one of a reference device for the area and a target device, the reference device being located at a predefined position with respect to the area, the at least one measurement being obtained by the detector according to the control message; and
determining a position of the target device with respect to the area based on the at least one measurement and a radio map, the radio map indicating signal strength corresponding to positions in the area.

9. The positioning server of claim 8, wherein the actions further comprising:
determining the set of channels by selecting a first channel allocated to the area and a second channel allocated to an adjacent area;
determining the time periods by determining each of the time periods for monitoring a respective channel of the set of channels based on a total detection period for monitoring the set of channels and a transmission interval for transmitting reference signals by the reference device; and
generating the control message that includes the set of channels and the time periods.

10. The positioning server of claim 8, wherein the actions further comprising:
determining a set of measurements from the at least one measurement of the signal based on a time window that is larger than a total detection period for monitoring the set of channels;
determining strength of the signal based on the set of measurements; and
determining the position of the target device with respect to the area based on the strength of the signal and the radio map.

11. The positioning server of claim 8, wherein the actions further comprising:
determining a transmission interval that is less than each of the time periods; and
sending the transmission interval to the reference device to configure the reference device to transmit reference signals according to the transmission interval.

12. The positioning server of claim 8, wherein the actions further comprising:
in response to a further detector being added to detect reference signals from the reference device, obtaining a first set of parameters of the detector related to reporting of the at least one measurement;
determining, based on the first set of parameters, a second set of parameters of the further detector related to reporting of at least one measurement made by the further detector; and
sending the second set of parameters to the further detector to synchronize the reporting of the detector and the reporting of the further detector.

13. The positioning server of claim 8, wherein the actions further comprising:
obtaining a predetermined knowledge base indicating a relationship between signal strength and the positions in the area; and
determining the radio map based on the knowledge base and a signal from the reference device.

14. The positioning server of claim 13, wherein the actions further comprising:
receiving, from the detector, a testing measurement of signals from a testing device and the reference device, the testing measurement being obtained by the detector according to the control message, the testing device being located in a position of the area;
determining signal strength based on the testing measurement; and
generating the knowledge base by determining a relationship between the signal strength and the position of the testing point.

\* \* \* \* \*